United States Patent
Chen et al.

(10) Patent No.: US 8,412,951 B2
(45) Date of Patent: Apr. 2, 2013

(54) CONTROL SYSTEM AND A SECURITY CHECKING METHOD THEREOF

(75) Inventors: Shao-Ping Chen, Hsin-chu (TW); Lin-Shu Chen, Hsin-chu (TW)

(73) Assignee: Socle Technology Corp., Hsin-Chu (TW)

(*) Notice: Subject to any disclaimer, the term of this patent is extended or adjusted under 35 U.S.C. 154(b) by 687 days.

(21) Appl. No.: 12/611,961

(22) Filed: Nov. 4, 2009

(65) Prior Publication Data

US 2010/0117789 A1    May 13, 2010

(30) Foreign Application Priority Data

Nov. 7, 2008    (TW) .............................. 97143212 A

(51) Int. Cl.
*G06F 21/00*    (2006.01)

(52) U.S. Cl. ........ 713/187; 713/161; 713/176; 713/179; 726/22

(58) Field of Classification Search .................. 713/160, 713/161, 176, 179, 187; 726/22
See application file for complete search history.

(56) References Cited

U.S. PATENT DOCUMENTS

2004/0031030 A1* 2/2004 Kidder et al. ................. 717/172

* cited by examiner

*Primary Examiner* — Justin T Darrow
(74) *Attorney, Agent, or Firm* — Alan Kamrath; Kamrath IP Lawfirm, P.A.

(57) ABSTRACT

A control system and a security checking method thereof is used in an embedded system. The control system includes a process module and a first memory module. The first memory module is used to store a pre-loader code and a first secure key. The security checking method includes the following steps: loading the pre-loader code and the first secure key; executing the pre-loader code to download a first program from an in-system programming module; determining whether the first program corresponds to the first secure key or not; if yes, then downloading a second program from the in-system programming module; and programming an internal program and a second secure key by the second program.

24 Claims, 3 Drawing Sheets

CONTROL SYSTEM AND A SECURITY CHECKING METHOD THEREOF

BACKGROUND OF THE INVENTION

1. Field of the Invention

The present invention relates to a control system and a security checking method thereof. More particularly, the present invention relates to a control system and a security checking method thereof applied in an embedded system.

2. Description of the Related Art

Nowadays, embedded systems, such as automatic teller machines (ATM) or personal digital assistants (PDA), have been widely and commonly designed and applied in almost all kinds of situations in our daily lives. In the prior arts, a control system was developed to be applied to each kind of embedded systems in order to save manufacturing costs. The control system can be associated with different interfaces and applications for being used as embedded systems of different purposes.

Because such type of control system can be used in all kinds of interfaces and applications, a security checking method is required to protect the control system from being damaged by unknown interfaces or applications.

In order to avoid the abovementioned disadvantages, some methods of protecting the control system of the embedded system have been disclosed in the prior arts. For example, if the control system is installed in the embedded system, the connection between the control system and an external device can be blocked by burning out hardware connection ports. Alternatively, the control system can be protected via a one time password (OTP) mechanism. However, the above prior art methods would always limit the expandability of the embedded system.

Therefore, there is a need to provide a control system and a security checking method thereof to mitigate and/or obviate the aforementioned problems.

SUMMARY OF THE INVENTION

It is an object of the present invention to provide a control system, which is capable of executing a security checking method in an embedded system.

It is another object of the present invention to provide a security checking method for being applied in an embedded system.

To achieve the abovementioned objects, the embedded system of the present invention comprises an in-system programming module, an external memory module and a control system. The control system is electrically connected to the in-system programming module and the external memory module. The control system comprises a process module and a first memory module. The first memory module is electrically connected to the process module, and is used for storing a pre-loader code and a first secure key.

The security checking method of the present invention comprises the following steps: loading a pre-loader code and a first secure key; executing the pre-loader code to download a first program from an in-system programming module; determining whether the first program corresponds to the first secure key; if yes, downloading a second program from the in-system programming module; and programming an internal program and a second secure key according to the second program.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, similar reference numerals denote similar elements throughout the several views, wherein.

DETAILED DESCRIPTION OF THE PREFERRED EMBODIMENTS

Figure 1:
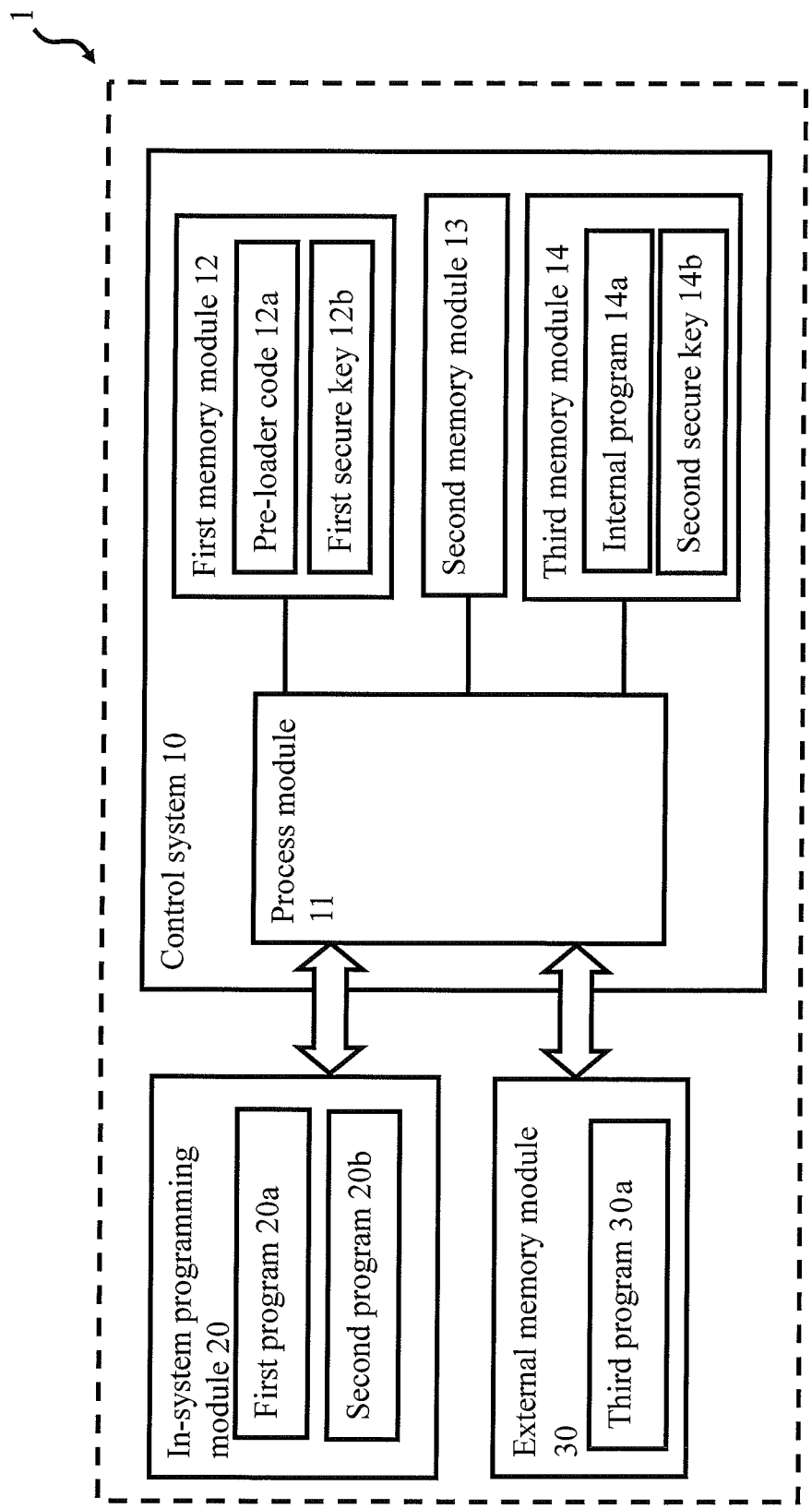
FIG. 1 illustrates a structural drawing of an embedded system according to the present invention.

Please refer to FIG. 1, which illustrates a structural drawing of an embedded system according to the present invention.

The embedded system 1 of the present invention comprises a control system 10, an in-system programming (ISP) module 20 and an external memory module 30, with the above elements electrically connected to each other. The control system 10 is, but not limited to, a system on a chip (SOC), a multi-chip package (MCP) or a system in package (SIP). The control system 10 comprises a process module 11, a first memory module 12, a second memory module 13 and a third memory module 14, with the above modules electrically connected to each other. If the control system 10 is a SOC, then, the process module 11, the first memory module 12, the second memory module 13 and the third memory module 14 are installed on the same chip. If the control system 10 is either a MCP or a SIP, then the abovementioned modules can be installed on different chips. Please note that the scope of the present invention is not limited to the above description.

The process module 11 is used for executing procedures requested by the control system 10. In this embodiment, the first memory module 12 is, but not limited to, a read-only memory module. The first memory module 12 is used for storing a pre-loader code 12a and a first secure key 12b. The process module 11 executes an initial system boot-up procedure according to the pre-loader code 12a, and then utilizes the first secure key 12b to check if a first program 20a of the in-system programming module 20 is valid, to further determine whether the in-system programming module 20 is a valid interface. The second memory module 13 is a volatile memory module, and is used for temporarily storing a valid program checked by a security checking method of the present invention, such as a second program 20b downloaded from the in-system programming module 20. The third memory module 14 is a non-volatile memory module, and is used for storing an internal program 14a. The internal program 14a is programmed according to the second program 20b. The internal program 14a has a second secure key 14b. The second secure key 14b is used for checking whether a program, such as a third program 30a downloaded from the external memory module 30, that the process module 11 is about to execute is valid or not. Please note that the steps of the security checking method of the present invention will be described hereinafter in more detail. Therefore, there is no need to describe the steps of the security checking method in this paragraph. The in-system programming module 20 is capable of doing programming. The in-system programming module 20 is used for programming programs required by the control system 10, and for further storing the programs into a memory module of the control system 10. The control system 10 can directly update/upgrade its firmware through the in-system programming module 20, such that the control system 10 can be associated with different embedded systems 1 such as, but not limited to, automatic teller machine (ATM) interfaces or personal digital assistant (PDA) interfaces. The external memory module 30 is a non-volatile memory module, and is used for storing the third program 30a required to be executed by the process module 11. Please note that the external memory module 30 can be installed in the embedded system 1, externally connected to the embedded system 1 via an expansion slot, or connected to the embedded system 1 via a network. Please note that the connection of the present invention is not limited to the above description. Further, the number of the second secure keys 14b can be increased or decreased according to the number of the third programs 30a. Thus, the scope of the present invention is not only limited to a single secure key.

According to the above description, the control system 10 can utilize the in-system programming module 20 to apply different kinds of firmware, and then can utilize different external memory modules 30, to establish embedded systems 1 of different purposes. In order to prevent the control system 10 from being connected to an invalid in-system programming module 20 or executing an invalid program which causes damage to the embedded system 1, it is necessary for the control system 10 to execute the security checking method in advance.

Figure 2:
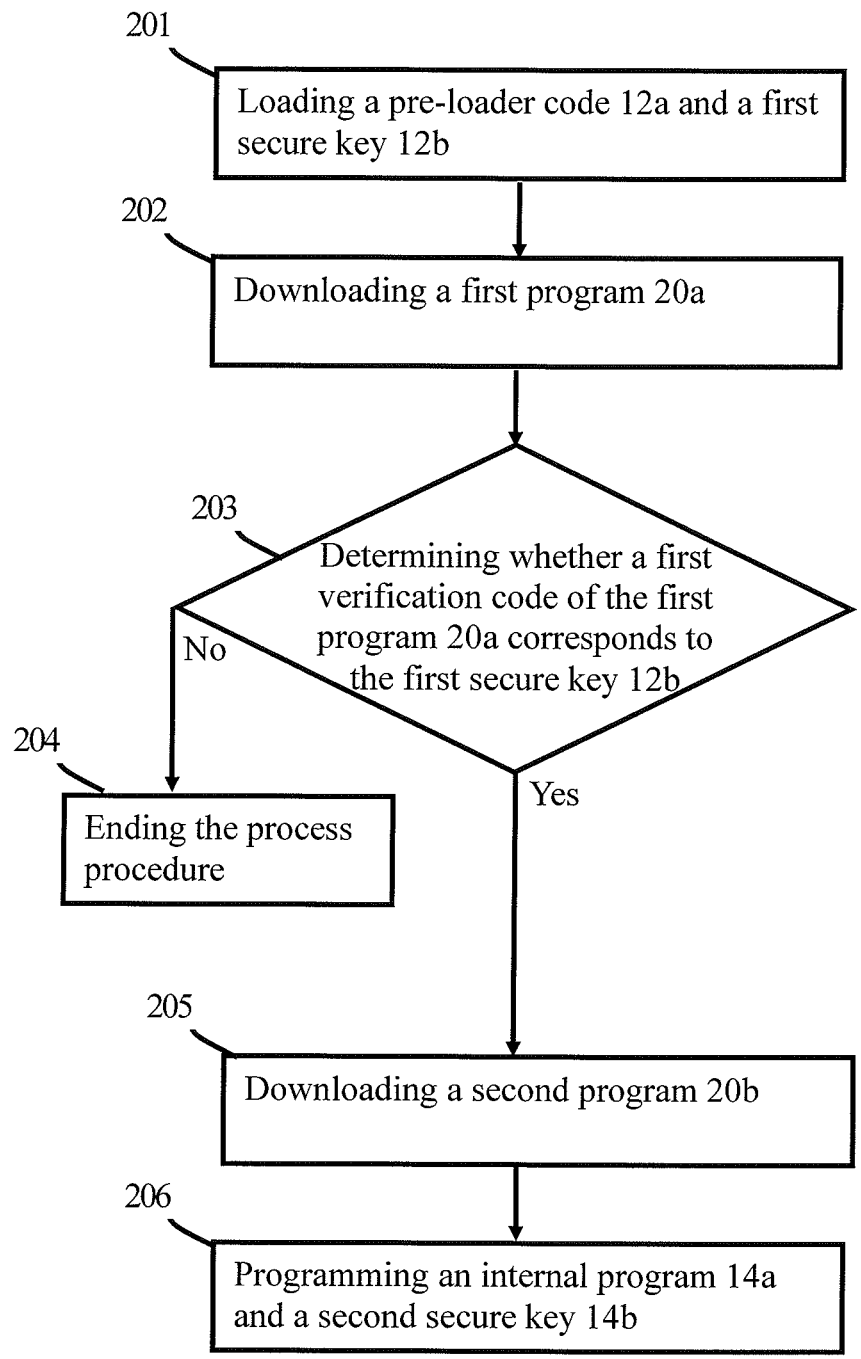
FIG. 2 illustrates a flowchart of a security checking method for a firmware structure of the embedded system according to the present invention.

Please refer to FIG. 2, which illustrates a flowchart of a security checking method for a firmware structure of the embedded system according to the present invention. Please note that the scope of the security checking method of the present invention is not limited to be applied in the control system 10 and the embedded system 1 as described in the following embodiment.

Firstly, the security checking method performs step 201: loading a pre-loader code 12a and a first secure key 12b.

When the embedded system 1 starts to execute its task, the process module 11 firstly loads the pre-loader code 12a and the first secure key 12b from the first memory module 12. The pre-loader code 12a and the first secure key 12b can be regarded as a firmware structure, and stored in the first memory module 12. The first memory module 12 is preferably a read-only memory module, such that a user cannot alter its stored content, thereby ensuring the safety and security of the embedded system 1.

Then, the security checking method performs step 202: downloading a first program 20a.

The process module 11 downloads the first program 20a from the in-system programming module 20 according to the configuration of the pre-loader code 12a. The first program 20a is an initial program, which is used for executing necessary initialization procedures, such as a boot-up procedure, of the embedded system 1.

Then, the security checking method performs step 203: determining whether a first verification code of the first program 20a corresponds to the first secure key 12b.

The first program 20a has a first verification code. The first verification code can be used as a reference for determining whether an access right of the in-system programming module 20 is valid, or whether the in-system programming module 20 is an approved interface to the control system 10. Therefore, at this time, the process module 11 would determine whether the first verification code of the first program 20a downloaded from the in-system programming module 20 corresponds to the first secure key 12b.

If the first verification code does not correspond to the first secure key 12b, the in-system programming module 20 is determined as an invalid, unqualified or unapproved interface to the control system 10.

As a result, the security checking method then performs step 204: ending the process procedure.

At this time, the process module 11 ends the process procedure of the embedded system 1. Meanwhile, the control system 10 can also send a warning signal to notify the user. Please note that the scope of the present invention is not limited to the above description.

In step 203, if the first verification code of the first program 20a does correspond to the first secure key 12b, the security checking method then performs step 205: downloading a second program 20b.

At this time, the process module 11 executes the pre-loader code 12a again, to download the second program 20b from the in-system programming module 20, and to store the second program 20b into the second memory module 13. At this point, because the in-system programming module 20 has been verified as a valid interface, the second program 20b can be verified as a valid program as well. Therefore, the in-system programming module 20 can control the control system 10 and its internal elements via the second program 20b. Because the second program 20b includes the second secure key 14b approved by the in-system programming module 20, the security checking method then executes the second program 20b to perform step 206.

Step 206: programming an internal program 14a and a second secure key 14b.

The process module 11 utilizes the second program 20b stored in the second memory module 13 to program the internal program 14a, and stores the internal program 14a into the third memory module 14. The internal program 14a is a related program required to be executed by the embedded system 1 under the environment of the in-system programming module 20. The internal program 14a further comprises the second secure key 14b. Because the embedded system 1 could possibly have an expansion function, the embedded system 1 can utilize the second secure key 14b to determine whether an expended program is valid.

The second secure key 14b is a software structure, such that the embedded system 1 not only has the protection from the first secure key 12b of the firmware, but also has the protection from the second secure key 14b of the software. The second secure key 14b may include a plurality of codes to match with a plurality of programs. Please note that the scope of the present invention is not limited to utilize only a single program.

Figure 3:
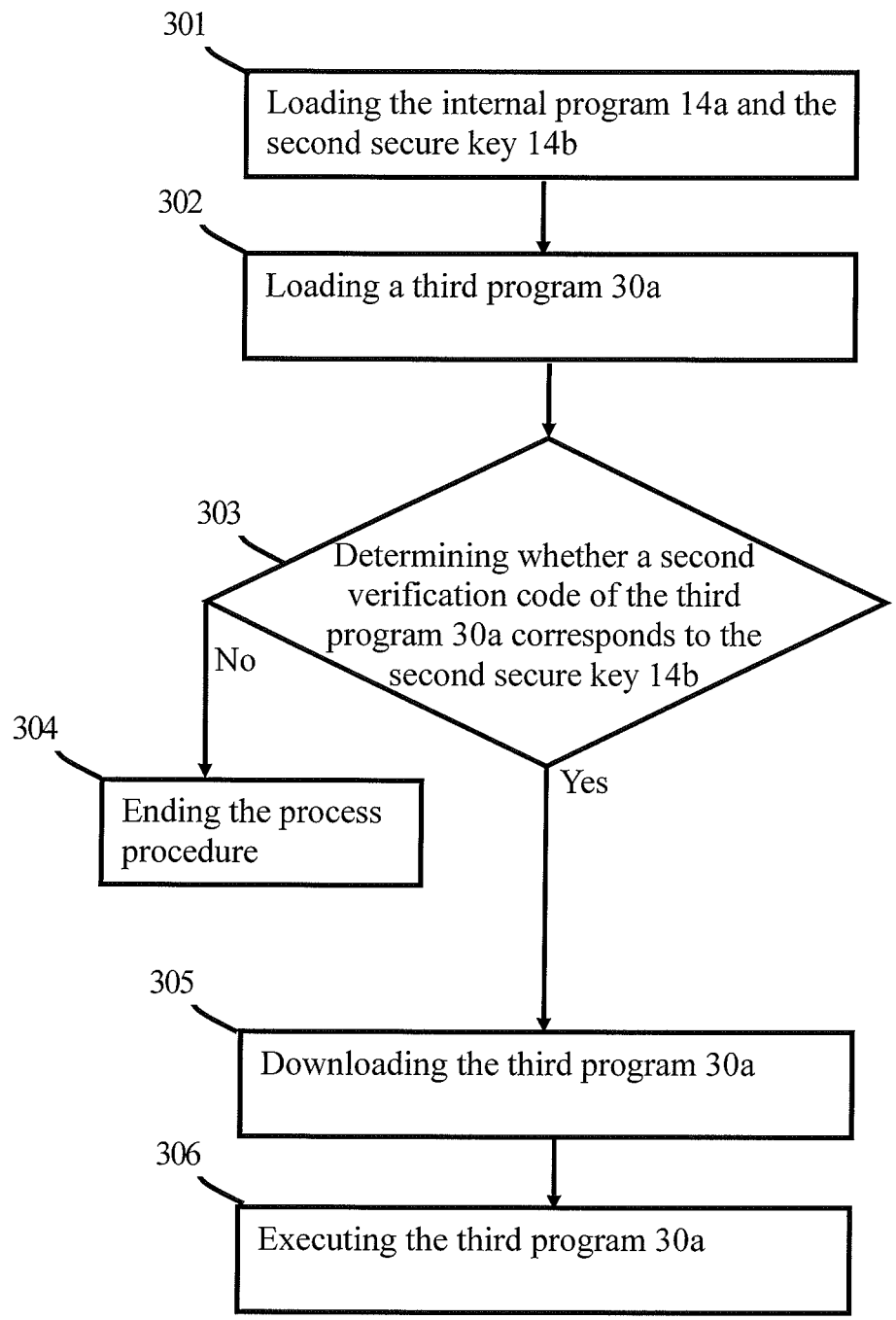
FIG. 3 illustrates a flowchart of a security checking method for a software structure of the embedded system according to the present invention.

Next, please refer to FIG. 3, which illustrates a flowchart of a security checking method for a software structure of the embedded system according to the present invention.

The scope of the embedded system 1 of the present invention is not limited to execute the programs provided by the in-system programming module 20. The embedded system 1 can also execute other additionally expanded programs.

Before the embedded system 1 executes an expanded program, the security checking method firstly performs step 301: loading the internal program 14a and the second secure key 14b.

At first, the process module 11 loads the internal program 14a and the second secure key 14b from the third memory module 14. The process module 11 executes a process procedure required by the embedded system 1 according to the internal program 14a.

Then, the security checking method performs step 302: loading a third program 30a.

At this time, if the embedded system 1 is going to execute the third program 30a stored in the external memory module 30, the process module 11 firstly loads the third program 30a from the external memory module 30. The third program 30a has a second verification code.

Then, the security checking method performs step: 303: determining whether a second verification code of the third program 30a corresponds to the second secure key 14b.

The second verification code of the third program 30a can be used as a reference for determining whether an access right of the third program 30a is valid, or whether the third program 30a is an approved program to the in-system programming module 20. Therefore, the process module 11 then reads the second secure key 14b stored in the third memory module 14 to compare with the second verification code.

If the second verification code does not correspond to the second secure key 14b, the third program 30a stored in the external memory module 30 is determined as an invalid, unqualified or unapproved program to the in-system programming module 20.

As a result, the security checking method then performs step 304: ending the process procedure.

At this time, the process module 11 stops executing the third program 30a to immediately terminate any related process procedures with the external memory module 30, to prevent the embedded system 1 from being damaged.

In step 303, if the second verification code does correspond to the second secure key 14b, the security checking method then performs step 305: downloading the third program 30a.

At this point, because the third program 30a stored in the external memory module 30 has been verified as a valid program, the process module 11 would download the third program 30a for being stored in the second memory module 13.

Finally, the security checking method performs step 306: executing the third program 30a.

The process module 11 executes the downloaded third program 30a, such that the embedded system 1 can execute the third program 30a as well, thereby expanding the functionality of the embedded system 1.

Please note that the security checking method of the present invention is not limited to be executed by following the above orders. The order of the abovementioned steps can be freely adjusted as long as the object of the present invention can be achieved.

Although the present invention has been explained in relation to its preferred embodiments, it is to be understood that many other possible modifications and variations can be made without departing from the spirit and scope of the invention as hereinafter claimed.

What is claimed is:

1. A control system, used in an embedded system for executing a security checking method, the control system comprising:
    a process module; and
    a first memory module, electrically connected to the process module, used for storing a pre-loader code and a first secure key, wherein when the control system is connected to an in-system programming (ISP) module, the process module executes the pre-loader code to download a first program programmed by the in-system programming module, and determines whether the first program corresponds to the first secure key, if the first program corresponds to the first secure key, the process module executes a second program programmed by the in-system programming module to program an internal program and a second secure key, wherein the process module and the first memory module are installed on one chip or different chips.

2. The control system as claimed in claim 1, wherein the process module utilizes a first verification code of the first program to determine whether the first program corresponds to the first secure key.

3. The control system as claimed in claim 1, wherein the first memory module is a read-only memory module.

4. The control system as claimed in claim 1 further comprising:
    a second memory module, electrically connected to the process module, used for temporarily storing the second program; and
    a third memory module, electrically connected to the process module, used for storing the internal program.

5. The control system as claimed in claim 4, wherein the process module is further used for loading a third program of an external memory module, so as to determine whether the third program corresponds to the second secure key, if the third program corresponds to the third secure key, the process module executes the third program.

6. The control system as claimed in claim 5, wherein the process module utilizes a second verification code of the third program to determine whether the third program corresponds to the second secure key.

7. The control system as claimed in claim 5, wherein the second memory module is further used for storing the third program.

8. The control system as claimed in claim 4, wherein the second memory module is a volatile memory module.

9. The control system as claimed in claim 4, wherein the third memory module is a non-volatile memory module.

10. The control system as claimed in claim 1, wherein the control system is a system on chip (SOC), a multi-chip package (MCP) or a system in package (SIP).

11. A security checking method, used in an embedded system, the security checking method comprising:
    loading a pre-loader code and a first secure key;
    executing the pre-loader code to download a first program programmed by an in-system programming module;
    determining whether the first program corresponds to the first secure key;
    if the first program corresponds to the first secure key, downloading a second program programmed by the in-system programming module; and
    programming an internal program and a second secure key according to the second program.

12. The security checking method as claimed in claim 11 further comprising the following step:
    utilizing a first verification code of the first program to determine whether the first program corresponds to the first secure key.

13. The security checking method as claimed in claim 11 further comprising the following steps:
    loading the internal program and the second secure key;
    loading a third program from an external memory module;
    determining whether the third program corresponds to the second secure key;
    if the third program corresponds to the second secure key, downloading the third program; and executing the third program.

14. The security checking method as claimed in claim 13 further comprising the following step:
utilizing a second verification code of the third program to determine whether the third program corresponds to the second secure key.

15. An embedded system, comprising:
an in-system programming module for programming a first program and a second program; and
a control system, electrically connected to the in-system programming module, the control system comprising:
a process module; and
a first memory module, electrically connected to the process module, used for storing a pre-loader code and a first secure key, wherein the process module executes the pre-loader code to download the first program from the in-system programming module, and determines whether the first program corresponds to the first secure key, if the first program corresponds to the first secure key, the process module executes the second program downloaded from the in-system programming module to program an internal program and a second secure key, wherein the process module and the first memory module of the control system are installed on one chip or different chips.

16. The embedded system as claimed in claim 15, wherein the process module utilizes a first verification code of the first program to determine whether the first program corresponds to the first secure key.

17. The embedded system as claimed in claim 15, wherein the first memory module is a read-only memory module.

18. The embedded system as claimed in claim 15, wherein the control system further comprises:
a second memory module, electrically connected to the process module, used for temporarily storing the second program; and
a third memory module, electrically connected to the process module, used for storing the internal program.

19. The embedded system as claimed in claim 18 further comprising an external memory module having a third program, wherein the process module is further used for loading the third program so as to determine whether the third program corresponds to the second secure key, if the third program corresponds to the second secure key, the process module executes the third program.

20. The embedded system as claimed in claim 19, wherein the process module utilizes a second verification code of the third program to determine whether the third program corresponds to the second secure key.

21. The embedded system as claimed in claim 19, wherein the second memory module is further used for storing the third program.

22. The embedded system as claimed in claim 18, wherein the second memory module is a volatile memory module.

23. The embedded system as claimed in claim 18, wherein the third memory module is a non-volatile memory module.

24. The embedded system as claimed in claim 15, wherein the control system is a system on chip (SOC), a multi-chip package (MCP) or a system in package (SIP).

* * * * *